United States Patent
Chin

(10) Patent No.: US 10,444,594 B2
(45) Date of Patent: Oct. 15, 2019

(54) MULTI-FUNCTION LENS DEVICE

(71) Applicant: SILICON TOUCH TECHNOLOGY INC., Hsinchu (TW)

(72) Inventor: Chi-Yuan Chin, Hsinchu (TW)

(73) Assignee: SILICON TOUCH TECHNOLOGY INC., Hsinchu (TW)

( * ) Notice: Subject to any disclaimer, the term of this patent is extended or adjusted under 35 U.S.C. 154(b) by 0 days.

(21) Appl. No.: 16/011,473

(22) Filed: Jun. 18, 2018

(65) Prior Publication Data
US 2019/0163029 A1    May 30, 2019

(30) Foreign Application Priority Data
Nov. 27, 2017    (TW) .............................. 106141176 A

(51) Int. Cl.
*G02F 1/29* (2006.01)
*G02B 27/22* (2018.01)
*G02B 27/02* (2006.01)
*G02F 1/1343* (2006.01)

(52) U.S. Cl.
CPC .............. *G02F 1/29* (2013.01); *G02B 27/02* (2013.01); *G02B 27/2214* (2013.01); *G02F 2001/134381* (2013.01); *G02F 2201/12* (2013.01); *G02F 2203/01* (2013.01)

(58) Field of Classification Search
CPC .... G02B 27/2214; G02B 27/02; G02B 6/003; G02B 6/0051; G02B 6/0031; G02B 6/0096; G02F 2001/134381; G02F 1/133615
See application file for complete search history.

(56) References Cited

U.S. PATENT DOCUMENTS

| | | | |
|---|---|---|---|
| 8,614,782 B2 | 12/2013 | Hong | |
| 9,134,568 B2 | 9/2015 | Choi et al. | |
| 2014/0049682 A1* | 2/2014 | Galstian | G02B 7/38 348/356 |

FOREIGN PATENT DOCUMENTS

| | | |
|---|---|---|
| CN | 205787458 U | 12/2016 |
| JP | 5921251 B2 | 5/2016 |
| TW | 201011350 A | 3/2010 |

\* cited by examiner

*Primary Examiner* — Phu Vu
(74) *Attorney, Agent, or Firm* — Li & Cai Intellectual Property (USA) Office

(57) ABSTRACT

The instant disclosure provides a multi-function lens device including a liquid crystal lens unit and a controller. Two liquid crystal lens structures of the liquid crystal lens unit respectively have a first matrix electric field and a second matrix electric field, and different electric field areas of the first and second matrix electric fields cooperate with each other according to a predetermined operation mode provided by the controller for generating at least two divisional scenes on a display screen of the multi-function lens device.

9 Claims, 5 Drawing Sheets

MULTI-FUNCTION LENS DEVICE

BACKGROUND

1. Technical Field

The instant disclosure relates to a lens device, in particularly, to a multi-function lens device.

2. Description of Related Art

Lens devices in the existing art are generally used as lens modules for capturing images in electronic devices. However, the diversity of the applications of lens devices is increasing nowadays. For example, lens devices can be used in wearable devices for increasing the variety of the scenes observed by the wearer.

However, in the existing art, there are still problems regarding the application of lens devices in electronic devices without involving complicated structures and operation principle, and high cost.

SUMMARY

The main object of the instant disclosure is to provide a multi-function lens device which is able to display multiple different divisional scenes on a single display by controlling the matrix electric fields therein according to a requirement of a user.

In order to achieve the above object, an embodiment of the instant disclosure is to provide a multi-function lens device including a liquid crystal lens unit and a controller. The controller is electrically connected to the liquid crystal lens unit. The liquid crystal lens unit includes at least two liquid crystal lens structures, and each liquid crystal lens structure includes a first electrode set, a second electrode set and a liquid crystal layer disposed between the first electrode set and the second electrode set. The second electrode set includes a first electrode structure and a second electrode structure. The first electrode structure includes a first transparent insulating layer and a first electrode layer disposed on the first transparent insulating layer. The second electrode structure includes a second transparent insulating layer and a second electrode layer disposed on the second transparent insulating layer. The first electrode layer includes a plurality of first conductive lines, and the second electrode layer includes a plurality of second conductive lines. The first conductive lines and the second conductive lines are separated from each other and alternatively arranged for providing a matrix electric field to the liquid crystal layer. The at least two liquid crystal lens structures respectively have a first matrix electric field and a second matrix electric field. The first matrix electric field includes a first electric field area and a second electric field area separated from the first electric field area. The second matrix electric field includes a third electric field area and a fourth electric field area separated from the third electric field area. The first electric field area and the third electric field area correspond to each other, and the second electric field area and the fourth electric field area correspond to each other. The controller provides a predetermined operation mode. The controller controls the at least two liquid crystal lens structures according to the predetermined operation mode for enabling the first electric field area of the first matrix electric field and the third electric field area of the second matrix electric field to cooperate with each other, thereby generating a first divisional scene on a display screen. The first divisional scene corresponds to the first electric field area and the third electric field area. The controller controls the at least two liquid crystal lens structures according to the predetermined operation mode for enabling the second electric field area of the first matrix electric field and the fourth electric field area of the second matrix electric field to cooperate with each other, thereby generating a second divisional scene on a display screen. The second divisional scene corresponds to the second electric field area and the fourth electric field area.

Another embodiment of the instant disclosure provides a multi-function lens device connected to a controller and including a liquid crystal lens unit. The liquid crystal lens unit includes at least two liquid crystal lens structures. Each of the liquid crystal lens structures includes a first electrode set, a second electrode set and a liquid crystal layer disposed between the first electrode set and the second electrode set. The second electrode set includes a first electrode structure and a second electrode structure. The first electrode structure includes a first transparent insulating layer and a first electrode layer disposed on the first transparent insulating layer. The second electrode structure includes a second transparent layer and a second electrode structure disposed on the second transparent layer. The first electrode layer includes a plurality of first conducive lines. The second electrode layer includes a plurality of second conductive lines. The first conductive lines and the second conductive lines are alternatively arranged for providing a matrix electric field to the liquid crystal layer. Each of the two liquid crystal lens structures includes a first matrix electric field and a second matrix electric field. The first matrix electric field includes a first electric field area and a second electric field area separated from the first electric field area. The second matrix electric field includes a third electric field area and a fourth electric field area separated from the third electric field area. The first electric field area and the third electric field area correspond to each other, and the second electric field area and the fourth electric field area correspond to each other. The liquid crystal lens unit enables the first electric field area of the first matrix electric field and the third electric field area of the second matrix electric field to cooperate with each other for generating a first divisional scene on the display screen corresponding to the first electric field area and the third electric field area based on a predetermined operation mode provided by the controller. The liquid crystal lens unit enables the second electric field area of the first matrix electric field and the fourth electric field area of the second matrix electric field to cooperate with each other for generating a second divisional scene on the display screen corresponding to the second electric field area and the fourth electric field area based on the predetermined operation mode provided by the controller.

Still another embodiment of the instant disclosure provides a multi-function lens device including at least two liquid crystal lens structures and a controller. The liquid crystal lens structures are adjacent to and corresponding to each other. The controller is electrically connected to the two liquid crystal lens structures, and the liquid crystal lens structures are controlled by the controller for providing a plurality of electric field areas. An original image light forms a first functional scene by a first image processing provided by the cooperation of an electric field area of one of the liquid crystal lens structures with an electric field area of another one of the liquid crystal lens structures. The original image light forms a second functional scene by a second image processing provided by the cooperation of another one of the electric field areas of one of the liquid crystal lens structures with another one of the electric field areas of another one of the liquid crystal lens structures. The first image processing and the second image processing are the same or different.

One of the advantages of the instant disclosure resides in that, based on the technical features of "at least two liquid crystal lens structures are adjacent and corresponding to each other" and "the controller is electrically connected to the at least two liquid crystal lens structures, and the liquid crystal lens structures provide a plurality of electric field areas by being controlled by the controller", the multi-function lens device provided by the instant disclosure can achieve the results of forming a first functional scene by a first image processing provided by the cooperation of an electric field area in one of the liquid crystal lens structures and an electric field area in another one of the liquid crystal lens structures, and forming a second functional scene by a second image processing provided by the cooperation of the other two electric field areas each belonging to a different liquid crystal lens structure. Therefore, the instant disclosure is able to provide different scenes while maintaining the quality of each scene.

In order to further understand the techniques, means and effects of the instant disclosure, the following detailed descriptions and appended drawings are hereby referred to, such that, and through which, the purposes, features and aspects of the instant disclosure can be thoroughly and concretely appreciated; however, the appended drawings are merely provided for reference and illustration, without any intention to be used for limiting the instant disclosure.

BRIEF DESCRIPTION OF THE DRAWINGS

The accompanying drawings are included to provide a further understanding of the instant disclosure, and are incorporated in and constitute a part of this specification. The drawings illustrate exemplary embodiments of the instant disclosure and, together with the description, serve to explain the principles of the instant disclosure.

DESCRIPTION OF THE EXEMPLARY EMBODIMENTS

Figure 1:
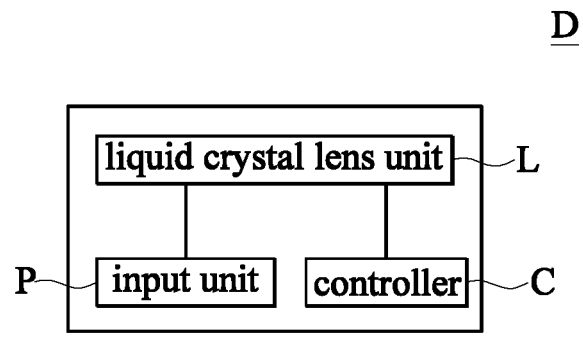
FIG. 1 is a functional block diagram of a multi-function lens device provided by an embodiment of the instant disclosure.

Reference will now be made in detail to the exemplary embodiments of the instant disclosure, examples of which are illustrated in the accompanying drawings. Wherever possible, the same reference numbers are used in the drawings and the description to refer to the same or like parts.

It should be noted that although the terms "first", "second", "third" are used to described various elements or signals, these elements and signals are not limited by the term since the terms are only used to distinguish one element from another, or one signal from another. In addition, the term "or" used in the instant disclosure can include any one or any combination of two or more associated items that are listed based on actual implementation.

Reference is made to FIG. 1. FIG. 1 is a functional block diagram of a multi-function lens device provided by an embodiment of the instant disclosure. The multi-function lens device D provided by the instant disclosure includes a liquid crystal lens unit U and a controller C. The controller C is electrically connected to the liquid crystal lens unit U. In another embodiment of the instant disclosure, the controller C is not a component belonging to the multi-function lens device D. In other words, the controller C can be disposed at the exterior of the multi-function lens device D and is electrically connected to the liquid crystal lens unit U (as an external component). In addition, the multi-function lens device D provided by the instant disclosure can further include an input unit P. The details of the input unit P will be described in related to FIG. 8.

Figure 2:
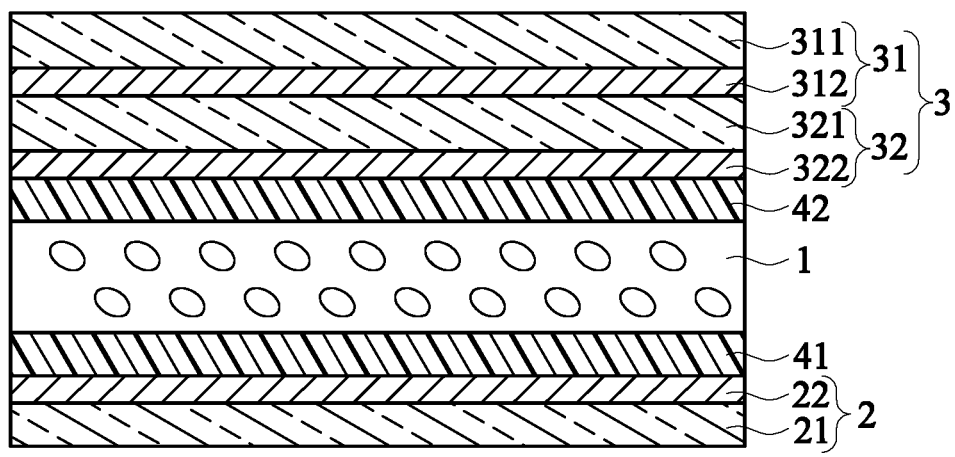
FIG. 2 is a schematic view of a liquid crystal lens structure in a liquid crystal lens unit used in an embodiment of the instant disclosure.
Figure 3:
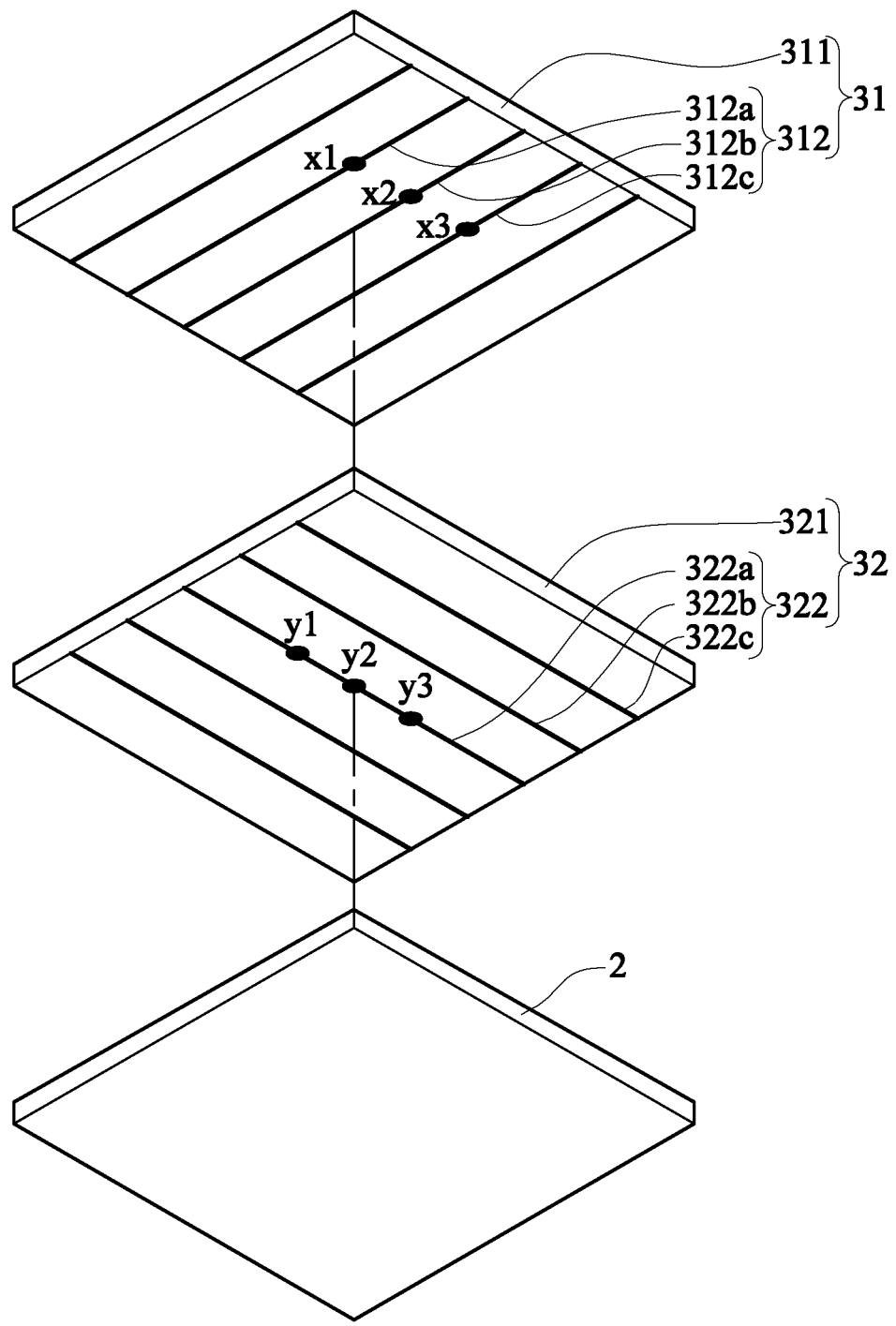
FIG. 3 is a schematic view showing the formation of a matrix electric field by the liquid crystal lens structure through the use of the first and second conductive lines in a liquid crystal lens unit of an embodiment of the instant disclosure.

Reference is made to FIG. 2 and FIG. 3. FIG. 2 is a schematic view of a liquid crystal lens structure in a liquid crystal lens unit used in an embodiment of the instant disclosure, and FIG. 3 is a schematic view showing the formation of a matrix electric field by the liquid crystal lens structures through the use of the first and second conductive lines in a liquid crystal lens unit of an embodiment of the instant disclosure. The structural features and operation manners of the liquid crystal lens unit U in the multi-function lens device D are described herein.

The liquid crystal lens unit U at least includes two liquid crystal lens structures L. As shown in FIG. 2, each of the liquid crystal lens structures L includes a first electrode set 2, a second electrode set 3 and a liquid crystal layer 1 disposed between the first electrode set 2 and the second electrode set 3. In the embodiment shown in FIG. 2, the first electrode set 2 is disposed under the liquid crystal layer 1, and the second electrode set 3 is disposed above the liquid crystal layer 1.

In addition, each of the liquid crystal structures L can further include a first alignment layer 41 and a second alignment layer 42. The first alignment layer 41 is disposed between the first electrode set 2 and the liquid crystal layer 1, and the second alignment layer 42 is disposed between the second electrode set 3 and the liquid crystal layer 1. The main function of the first alignment layer 41 and the second alignment layer 42 is to align the arranging direction of the liquid crystal molecules in the liquid crystal layer 1 for achieving intended rotation (orientation) after receiving an electric field.

The first electrode set 2 includes a transparent insulating layer 21 and an electrode layer 22. The electrode layer 22 is disposed on the transparent insulating layer 21. Specifically, the first electrode set 2 includes the transparent insulating layer 21 serving as a substrate and the electrode layer 22 including conductive tracks. The second electrode set 3 includes a first electrode structure 31 and a second electrode structure 32. The first electrode structure 31 includes a first transparent insulating layer 311 and a first electrode layer 312 disposed on the first transparent insulating layer 311. The second electrode structure 32 includes a second transparent insulting layer 321 and a second electrode layer 322 disposed on the second transparent insulting layer 321.

In other words, in the embodiment shown in FIG. 2, the first electrode set 2 only includes a single "substrate (the transparent insulating layer 21)/conductive track (the electrode layer 22) structure", and the second electrode set 3 includes two "substrate/conductive track structures". The first electrode structure 31 and the second electrode structure 32 of the second electrode set 3 each are a substrate/conductive track structure.

In the embodiment shown in FIG. 2, the first electrode layer 312 is dispose between the first transparent insulating layer 311 and the second transparent insulting layer 321, and the second electrode layer 322 is disposed between the second transparent insulting layer 321 and the liquid crystal layer 1. In other words, the second electrode layer 322, the second transparent insulating layer 321, the first electrode layer 312 and the first transparent insulating layer 311 are sequentially arranged along a direction away from the liquid crystal layer 1. However, the order of the layered structures in the second electrode set 3 is not limited in the instant disclosure. For example, the order of the arrangement of the layered structures can be the second transparent insulating layer 321—the second electrode layer 322—the first transparent insulating layer 311—the first electrode layer 312 along a direction away from the liquid crystal layer 1.

It should be noted that since the liquid crystal lens structure L provided by the embodiments of the instant disclosure can produce an effect similar to that of an optical lens after light passes through by changing the degree of deflection (orientation) of the liquid crystal molecules, each of the layered structures of the liquid crystal lens structure L is preferably made of light-transmitting materials for allowing light to pass through the liquid crystal lens structure L.

In the embodiments of the instant disclosure, the transparent insulating layer 21 of the first electrode set 2 and the first transparent insulating layer 311 and the second transparent insulating layer 321 of the second electrode set 3 are light-transmittable. For example, the transparent insulating layer 21, the first transparent insulating layer 311 and the second transparent insulating layer 321 are made of glass materials.

In addition, the electrode layer 22 of the first electrode set 2 and the first electrode layer 312 and the second electrode layer 322 of the second electrode set 3 can be made of light-transmitting conductive materials such as indium tin oxide (ITO), indium zinc oxide (IZO), indium gallium zinc oxide (IGZO) or any combination thereof. However, the instant disclosure is not limited thereto.

The thickness of each layered structure in the liquid crystal lens structure L would affect the effects (such as the permeability) of light passing through the liquid crystal lens structure L and the electric field strength needed for driving the liquid crystal molecules to deflect. Moreover, since existing electronic devices have become compact and miniaturized, and the liquid crystal lens structure or the liquid crystal lens including the same has been widely used in these electronic devices, the liquid crystal lens structure and related products preferably have small dimensions to fulfill the requirements of light-weight and portability of the electronic devices. Therefore, in the embodiments of the instant disclosure, the thicknesses of the layered structures of the liquid crystal lens structure L, particularly the transparent insulating layer 21, the first transparent insulating layer 311 and the second transparent insulating layer 321 in the electrode set are controlled in an appropriate range.

For example, in the embodiments of the instant disclosure, each of the transparent insulating layer 21, the first transparent insulating layer 311 and the second transparent insulating layer 321 has a thickness from 0.01 mm to 0.2 mm; preferably a thickness from 0.01 to 0.1 mm and most preferably a thickness from 0.01 to 0.05 mm.

Specifically, when each of the transparent insulating layer 21, the first transparent insulating layer 311 and the second transparent insulating layer 321 has a thickness in the above ranges, the overall dimension of the liquid crystal lens structure L can be significantly reduced. Compared to the glass layer serving as the substrate of conductive lines in the existing liquid crystal lens structures which generally has a thickness greater than 0.5 mm, the transparent insulating layer 21, each of the first transparent insulating layer 311 and the second transparent insulating layer 321 is a glass layer of 0.05 mm, thereby reducing the overall thickness of the liquid crystal lens structure L by 1.35 mm.

Referring to FIG. 3, the first electrode layer 312 includes a plurality of first conductive lines (312a, 312b, 312c) and the second electrode layer 322 includes a plurality of second conductive lines (322a, 322b, 322c). The first conductive lines (312a, 312b, 312c) and the second conductive lines (322a, 322b, 322c) are separated from each other and arranged alternately. In the embodiment shown in FIG. 3, the plurality of first conductive lines (312a, 312b, 312c) are arranged along a direction perpendicular to a direction on which the second conductive lines (322a, 322b, 322c) are arranged.

Based on the design of the first electrode structure 31 and the second electrode structure 32 in the second electrode set 3, the first electrode set 2 and the second electrode set 3 of the liquid crystal lens structure L provided by the embodiments of the instant disclosure can cooperate with each other to generate a matrix electric field. To be specific, as shown in FIG. 1, the liquid crystal lens structure L provided by the embodiments of the instant disclosure can further include a driver 5 (not shown). The driver 5 is electrically connected to the first electrode set 2 and the second electrode set 3. The driver 5 can provide the same or different electric voltages to the first electrode structure 31 and the second electrode structure 32 for generating a voltage difference between the first electrode set 2 and the second electrode set 3, thereby providing an electric field to the liquid crystal layer 1 located between the first electrode set 2 and the second electrode set 3.

Specifically, the driver 5 can provide the same or different electric voltages to each of the first conductive lines (312a, 312b, 312c) of the first electrode layer 312 of the first electrode structure 31 and each of the second conductive lines (322a, 322b, 322c) of the second electrode layer 322 of the second electrode structure 32. In other words, the first conductive line 312a, the first conductive line 312b and the first conductive line 312c can be provided with the same or different electric voltages, and the second conductive line 322a, the second conductive line 322b and the second conductive line 322c can be provided with the same or different electric voltages. Therefore, the first conductive lines (312a, 312b, 312c) and the second conductive lines (322a, 322b, 322c) arranged on the first transparent insulating layer 311 and the second transparent insulating layer 321 respectively have a voltage difference relative to the first electrode set 2, thereby providing an electric field to the liquid crystal layer 1. Specifically, the electric field provided to the liquid crystal layer 1 by the first conductive lines (312a, 312b, 312c) and the second conductive lines (322a, 322b, 322c) is a matrix electric field.

In the embodiments of the instant disclosure, the term "matrix electric field" represents that the electric field has a plurality of inducting points defined in a matrix, and by controlling the electric voltages applied to the first conductive lines (312a, 312b, 312c) and the second conductive lines (322a, 322b, 322c), the plurality of inducting points can have the same or different electric field strength.

Referring to FIG. 3, the first conductive lines (312a, 312b, 312c) have a plurality of first corresponding points (x1, x2, x3), and the second conductive lines (322a, 322b, 322c) have a plurality of second corresponding points (y1, y2, y3). The plurality of first corresponding points (x1, x2, x3) of the first conductive lines (312a, 312b, 312c) and the plurality of second corresponding points (y1, y2, y3) of the second conductive lines (322a, 322b, 322c) cooperate with each other to provide a matrix electric field having a plurality of inducting points. Each of the inducting points includes one of the first corresponding points (x1, x2, x3) and one of the second corresponding points (y1, y2, y3), and the one of the first corresponding points (for example x1) and the one of the second corresponding points (for example y1) correspond to each other.

In FIG. 3, the first corresponding point x1, the first corresponding point x2 and the first corresponding point x3 are arranged on different conductive lines of the first electrode layer 312. The second corresponding point y1, the second corresponding point y2 and the second corresponding point y3 are all arranged on the second conductive line 322a (i.e., the same conductive line). It should be noted that the corresponding points shown in the figures are only presented for the convenience of description and not for limiting the scope of the instant disclosure. In the instant disclosure, any first corresponding point can be arranged on any position on any first conductive line, and any second corresponding point can be arranged on any position on any second conductive line as long as the first corresponding points and the second corresponding points can correspond to each other and form the inducting points in the matrix electric field.

In other words, in the embodiment shown in FIG. 3, the electric field of the inducting points of the matrix electric field is generated by the electric voltages applied to the conductive lines in two layers of the electrode layer.

As mentioned above, since the inducting points in the matrix electric field have the same or different electric field strength, different locations in the liquid crystal layer 1 corresponding to the inducting points in the matrix electric field are subjected to different electric field strength, thereby allowing the liquid crystal molecules to rotate (deflect) in different directions or degrees. In other words, when the driver 5 provides driving voltages to the first electrode set 2 and the second electrode set 3, the liquid crystal molecules in the liquid crystal layer 1 can have different rotation (orientation) modes in accordance with different electric fields in the matrix electric field.

Figure 4:
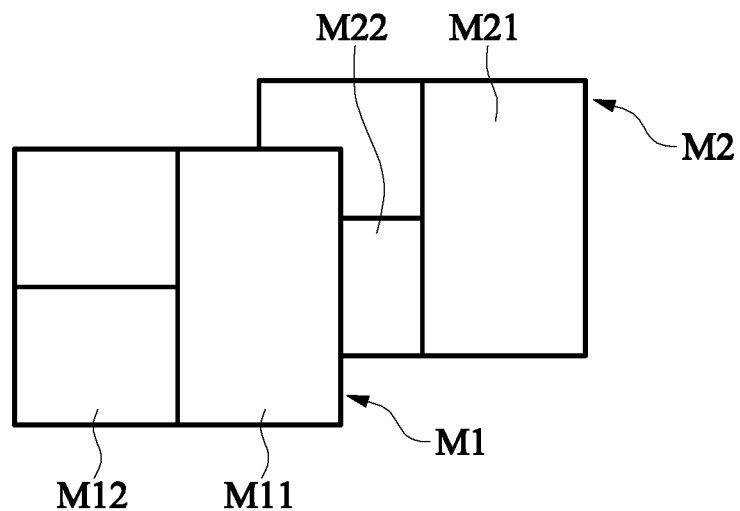
FIG. 4 is a schematic view showing the relationship between different electric field areas in the first and second matrix electric fields in an embodiment of the instant disclosure.
Figure 5:
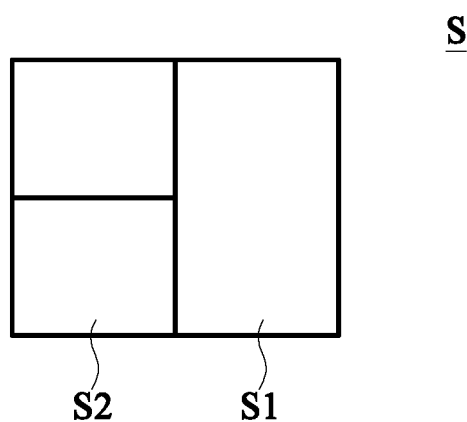
FIG. 5 is a schematic view of a display scene of the multi-function lens device provided by an embodiment of the instant disclosure.

As mentioned above, the liquid crystal lens unit U at least includes two liquid crystal lens structures L. Therefore, based on the structural design above, the two liquid crystal lens structures L respectively have a first matrix electric field M1 and a second matrix electric field M2. Reference is made to FIG. 4 and FIG. 5. FIG. 4 is a schematic view showing the relationship between different electric field areas in the first and second matrix electric field in an embodiment of the instant disclosure, and FIG. 5 is a schematic view of a display scene of the multi-function lens device provided by an embodiment of the instant disclosure.

Specifically, one of the technical features of the instant disclosure is that based on the adjustment and the design of the first matrix electric field M1 and the second matrix electric field M2, more than one divisional scenes including the same or different images/scenes can be shown on the display screen S of the multi-function lens device D.

As shown in FIG. 4, the first matrix electric field M1 includes a first electric field area M11 and a second electric field area M12 separated from the first electric field area M11. The second matrix electric field M2 includes a third electric field area M21 and a fourth electric field area M22 separated from the third electric field area M21. The first electric field area M11 and the third electric field area M21 correspond to each other, and the second electric field area M12 and the fourth electric field area M22 correspond to each other.

For example, the first electric field area M11 and the third electric field area M21 are corresponding to each other, parallel to each other and have a same area, and the second electric field area M12 and the fourth electric field area M22 are corresponding to each other, parallel to each other and have a same area. It should be noted that although the first electric field area M11 and the second electric field area M12 shown in FIG. 4 are adjacent to each other, in other implementations, the first electric field area M11 can be an electric field area surrounding the second electric field area M12 and does not overlap with the second electric field area M12. In other words, the arrangement of the electric field areas can be adjusted based on the requirements of the product.

Referring to FIG. 5, the display screen S illustrated in FIG. 5 can be formed by the first matrix electric field M1 and the second matrix electric field M2 shown in FIG. 4. Specifically, the controller C of the multi-function lens device D or the controller C arranged outside of the multi-function lens device D (in the implementations that the controller C is not belonging to the multi-function lens device D) can control the two liquid crystal lens structures L and the matrix electric fields therein by a predetermined operation mode. For example, the predetermined operation mode can be an operation mode pre-set by a specific person (for example, the manufacturer or the user) for forming the divisional scene on the display screen S of the multi-function lens device D based on the user needs.

For example, in the embodiment shown in FIG. 4 and FIG. 5, the predetermined operation mode can divide the display screen S into at least two divisional scenes (the first divisional scene S1 and the second divisional scene S2 shown in FIG. 5). In the instant disclosure, the predetermined operation mode can be adjusted based on the requirements.

Referring to FIG. 5, the controller C provides the predetermined operation mode for controlling the two liquid crystal lens structures L. Therefore, the first electric field area M11 of the first matrix electric field M1 cooperates with the third electric field area M21 of the second matrix electric field M2, and a first divisional scene S1 corresponding to the first electric field area M11 and the third electric field area M21 is generated on the display screen S of the multi-function lens device D. Meanwhile, the controller C controls the two liquid crystal lens structures L according to the predetermined operation mode for enabling the second electric field area M12 of the first matrix electric field M1 and the fourth electric field area M22 of the second matrix electric field M2 to cooperate with each other, thereby generating a second divisional scene S2 corresponding to the second electric field area M12 and the fourth electric field area M22 on the display screen S of the multi-function lens device D.

In other words, in the instant disclosure, an original image light can form a first functional scene (such as the first divisional scene S1) based on a first image processing provided by the cooperation of one of the electric field areas (such as the first electric field area M11 of the first matrix electric field M1) of one of the liquid crystal lens structures L and another one of the electric field areas (such as the third electric field area M21 of the second matrix electric field M2) of another one of the liquid crystal lens structures L.

Meanwhile, in the instant disclosure, the original image light can form a second functional scene (such as the second divisional scene S2) based on a second image processing provided by the cooperation of another one of the electric field areas (such as the second electric field area M12 of the first matrix electric field M1) of one of the liquid crystal lens structures L and another one of the electric field areas (such as the fourth electric field area M22 of the second matrix electric field M2) of another one of the liquid crystal lens structures L.

The first image processing and the second image processing can be the same or different. In the embodiments of the instant disclosure, the first divisional scene S1 and the second divisional scene S2 obtained by the first image processing and the second image processing respectively can be an original scene or a focused scene. Specifically, in an implementation of the instant disclosure, by controlling the first matrix electric field M1 and the second matrix electric field M2, the molecules in the liquid crystal layer 1 of each of the two liquid crystal lens structures L can be remained in a non-rotated state, and hence, the original image light (such as light in the environment) can directly pass through the multi-function lens device D for enabling the user to observe the original scene (having original size, brightness, etc.) right in front of him/her by the liquid crystal lens unit U of the multi-function lens device D.

In addition, by controlling the first matrix electric field M1 and the second matrix electric field M2, the molecules in the liquid crystal layer 1 of each of the two liquid crystal lens structures L and corresponding to the second electric field area M12 and the fourth electric field area M22 can rotate for generating the second divisional scene S2 which is a focused scene.

In addition, the liquid crystal lens unit U in the multi-function lens device D provided by the instant disclosure can include three liquid crystal lens structures L. In other words, in addition to the two liquid crystal lens structures L having the first matrix electric field M1 and the second matrix electric field M2 respectively, the liquid crystal lens unit U can further include another liquid crystal lens unit L having a first matrix electric field M3.

Figure 6:
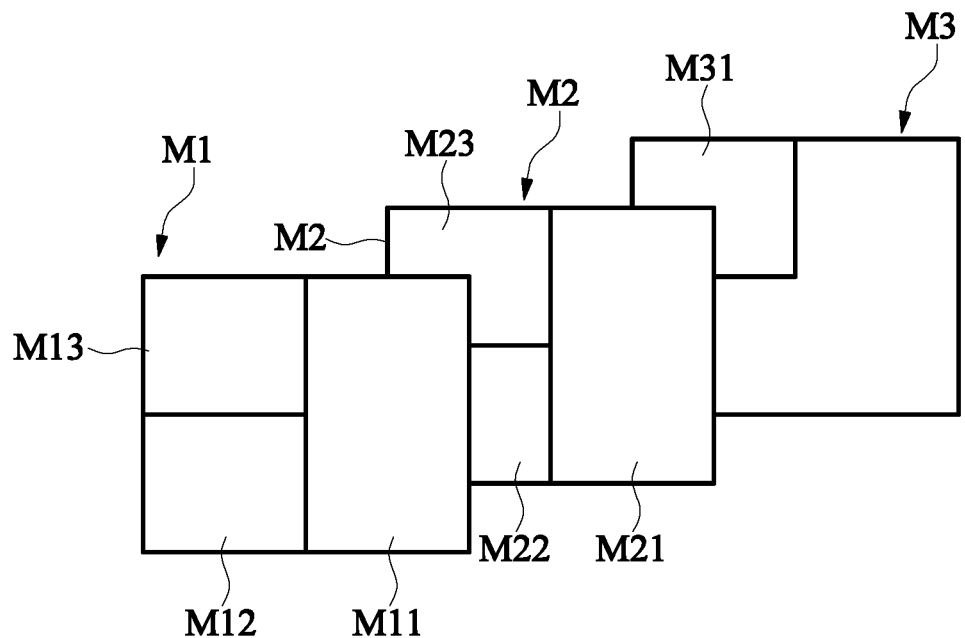
FIG. 6 is a schematic view showing the relationships between different electric field areas in the first and second matrix electric fields in another embodiment of the instant disclosure.
Figure 7:
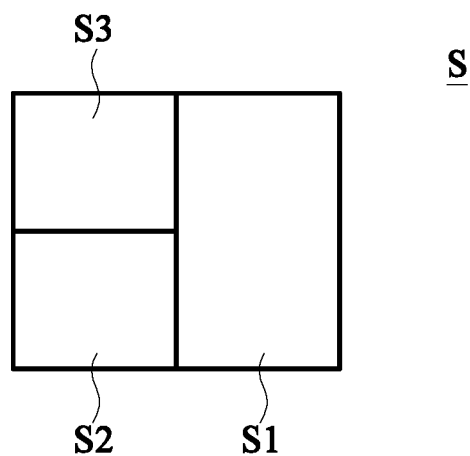
FIG. 7 is a schematic view of a display scene of the multi-function lens device provided by another embodiment of the instant disclosure.

Reference is made to FIG. 6 and FIG. 7. FIG. 6 is a schematic view showing the relationship between different electric field areas in the first and second matrix electric fields in another embodiment of the instant disclosure, and FIG. 7 is a schematic view of a display scene of the multi-function lens device provided by another embodiment of the instant disclosure. As shown in FIG. 6, the first matrix electric field M1 has a fifth electric field area M13 in addition to the first electric field area M11 and the second electric field area M12. In addition, the second matrix electric field M2 has a sixth electric field area M23 in addition to the third electric field area M21 and the fourth electric field area M22. The first matrix electric field M3 has a seventh electric field area M31 corresponding to the fifth electric field area M13 and the sixth electric field area M23.

The main difference between the previous embodiment and the embodiment shown in FIG. 6 and FIG. 7 is that the liquid crystal lens unit U of the multi-function lens device D includes at least three liquid crystal lens structures L, and the three liquid crystal lens structures L can cooperate with each other for achieving the effect of focusing images.

For example, as mentioned above, the controller C can control the three liquid crystal lens structures L according to a predetermined operation mode for generating a third divisional scene S3 corresponding to the fifth electric field area M13 of the first matrix electric field M1, the sixth matrix electric field M23 of the second matrix electric field M2 and the seventh electric field area M31 of the first matrix electric field M3 on the display screen S of the multi-function lens device D based on the cooperation of the fifth electric field area M13, the sixth matrix electric field M23 and the seventh electric field area M31. The third divisional scene S3 formed by the cooperation of the three liquid crystal lens structures L can be a zoom-in or a zoom-out scene.

Figure 8:
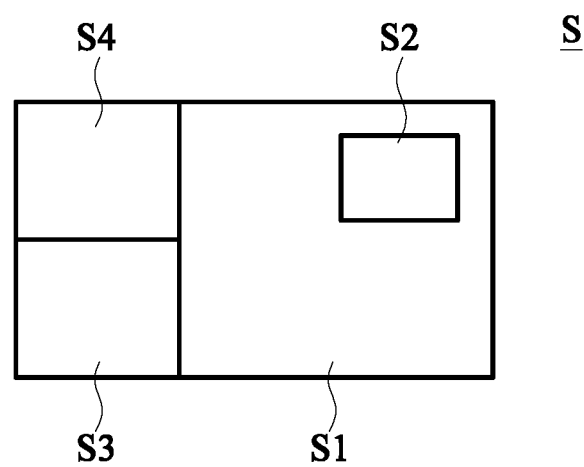
FIG. 8 is a schematic view of a display scene of the multi-function lens device provided by yet another embodiment of the instant disclosure.

Reference is made to FIG. 8. FIG. 8 is a schematic view of a display scene of the multi-function lens device provided by another embodiment of the instant disclosure. Referring to FIG. 1, the multi-function lens device D provided by the instant disclosure further includes an input unit P in addition to the liquid crystal lens unit U and the controller C. The input unit P can be used to input an external signal into the multi-function lens device D for displaying an external media signal on the fourth divisional scene S4 of the display screen S. The external media signal can be at least one of a video, an image or a text signal.

Specifically, the content shown in the display screen S of the multi-function lens device D is not limited to the scene observed by the user (the scene in front of the user) and can further include media signals input from external sources. For example, the multi-function lens device D can further include components such as a back light plate (not shown in the figures) for enabling the multi-function lens device D to act as a display, thereby providing external media signals to the user.

As shown in FIG. 8, the first divisional scene S1 and the second divisional scene S2 are in the form of "picture in picture". The first divisional scene S1 can be an original scene in front of the user. The second divisional scene S2 can be a focused scene generated by the operation of the liquid crystal lens unit U. For example, based on the predetermined operation mode, the controller C can enable the liquid crystal lens unit U to focus on a part of the scene in front of the user.

The third divisional scene S3 can be a zoom-in scene. For example, based on a predetermined operation mode, the controller C can control the at least three liquid crystal lens structures L in the liquid crystal lens unit U; for zooming-in or zooming-out a part of the scene in front of the user. In addition, the third divisional scene S3 can display an external media signal on the display screen S through other components of the multi-function lens device D.

Therefore, based on the design of the multi-function lens device D, especially the design of the matrix electric fields in the liquid crystal lens unit U, the instant disclosure can provide the same or different divisional scenes on a single display scene S. In addition, based on a single programmed controller C, the multi-function lens device D can adjust the effect of the liquid crystal lens unit U without increasing the complexity of the overall structure, thereby controlling the displaying manner and the content of the display screen S.

Effects of the Embodiments

One of the advantages of the instant disclosure resides in that, based on the technical features of "at least two liquid crystal lens structures L are adjacent and corresponding to each other" and "the controller C is electrically connected to the at least two liquid crystal lens structures L, and the liquid crystal lens structures L provide a plurality of electric field areas by being controlled by the controller C", the multi-function lens device D provided by the instant disclosure can achieve the results of forming a first functional scene by a first image processing process obtained by the cooperation of an electric field area and another electric field area in a liquid crystal lens structure L and a second functional scene by a second image processing process obtained by the cooperation of the other two electric field areas in the liquid crystal lens L. Therefore, the instant disclosure is able to provide different scenes while maintaining the quality of each scene.

Specifically, in the instant disclosure, based on the functional operation of the liquid crystal layer 1 in the lens structures (the liquid crystal lens unit U including the liquid crystal lens unit L), different electrical signal processing processes can be carried out toward the different areas of the display screen S for enabling the areas to display different image information.

The above-mentioned descriptions represent merely the exemplary embodiment of the present disclosure, without any intention to limit the scope of the instant disclosure thereto. Various equivalent changes, alterations or modifications based on the claims of the instant disclosure are all consequently viewed as being embraced by the scope of the instant disclosure.

What is claimed is:

1. A multi-function lens device, including:
  a liquid crystal lens unit; and
  a controller electrically connected to the liquid crystal lens unit;
  wherein the liquid crystal lens unit includes at least two liquid crystal lens structures, and each of the liquid crystal lens structures includes a first electrode set, a second electrode set and a liquid crystal layer disposed between the first electrode set and the second electrode set;
  wherein the second electrode set includes a first electrode structure and a second electrode structure, the first electrode structure including a first transparent insulating layer and a first electrode layer disposed on the first transparent insulating layer, the second electrode structure including a second transparent insulating layer and a second electrode layer disposed on the second transparent insulating layer;
  wherein the first electrode layer includes a plurality of first conductive lines, the second electrode layer includes a plurality of second conductive lines, and the first conductive lines and the second conductive lines are separated from each other and alternatively arranged for providing a matrix electric field to the liquid crystal layer;
  wherein the at least two liquid crystal lens structures respectively have a first matrix electric field and a second matrix electric field, the first matrix electric field including a first electric field area and a second electric field area separated from the first electric field area, the second matrix electric field including a third electric field area and a fourth electric field area separated from the third electric field area, the first electric field area and the third electric field area corresponding to each other, the second electric field area and the fourth electric field area corresponding to each other;
  wherein the controller provides a predetermined operation mode;
  wherein the controller controls the at least two liquid crystal lens structures according to the predetermined operation mode for enabling the first electric field area of the first matrix electric field and the third electric field area of the second matrix electric field to cooperate with each other, thereby generating a first divisional scene on a display screen, the first divisional scene corresponding to the first electric field area and the third electric field area;
  wherein the controller controls the at least two liquid crystal lens structures according to the predetermined operation mode for enabling the second electric field area of the first matrix electric field and the fourth electric field area of the second matrix electric field to cooperate with each other, thereby generating a second divisional scene on a display screen, the second divisional scene corresponding to the second electric field area and the fourth electric field area.

2. The multi-function lens device according to claim 1, wherein:
  the liquid crystal lens unit further includes another liquid crystal lens structure having a third matrix electric field, the first matrix electric field further including a fifth electric field area separated from the first electric field area and the second electric field area, the second matrix electric field further including a sixth electric field area separated from the third electric field area and the fourth electric field area, the third matrix electric field having a seventh electric field area corresponding to the fifth electric field area and the sixth electric field area;
  wherein the controller is configured to control the liquid crystal lens structures according to the predetermined operation mode for enabling the fifth electric field area of the first matrix electric field, the sixth electric field area of the second matrix field and the seventh electric field area of the third matrix field to cooperate with each other, thereby generating a third divisional scene on the display screen, the third divisional scene corresponding to the fifth electric field area, the sixth electric field area and the seventh electric field area;
  wherein the third divisional scene is a zoom-in image or a zoom-out image.

3. The multi-function lens device according to claim 1, wherein the first divisional scene is an original scene.

4. The multi-function lens device according to claim 3, wherein the first electric field area of the first matrix electric field and the third electric field area of the second matrix electric field cooperate with each other for allowing an original image light to directly pass through the liquid crystal lens unit, thereby forming the original scene.

5. The multi-function lens device according to claim 1, wherein the second divisional scene is a focused scene.

6. The multi-function lens device according to claim 1, wherein the second electric field area of the first matrix electric field and the fourth electric field area of the second matrix electric field cooperate with each other for enabling the focused scene to be formed by an original image light passing through the liquid crystal layer, wherein a plurality of liquid crystal molecules in the liquid crystal layer are oriented.

7. The multi-function lens device according to claim 1, further including an input unit, the input unit being configured to input an external signal to the multi-function lens device for enabling a fourth divisional scene of the display screen to display an external media signal, wherein the external media signal is at least one of a video, a picture and a text signal.

8. A multi-function lens device, the multi-function lens device being connected to a controller and including a liquid crystal lens unit, the liquid crystal lens unit including at least two liquid crystal lens structures, each of the liquid crystal lens structures including a first electrode set, a second electrode set and a liquid crystal layer disposed between the first electrode set and the second electrode set;
   wherein the second electrode set includes a first electrode structure and a second electrode structure, the first electrode structure including a first transparent insulating layer and a first electrode layer disposed on the first transparent insulating layer, and the second electrode structure including a second transparent layer and a second electrode structure disposed on the second transparent layer;
   wherein the first electrode layer includes a plurality of first conducive lines, the second electrode layer includes a plurality of second conductive lines, and the first conductive lines and the second conductive lines are alternatively arranged for providing a matrix electric field to the liquid crystal layer;
   wherein each of the two liquid crystal lens structures includes a first matrix electric field and a second matrix electric field, the first matrix electric field including a first electric field area and a second electric field area separated from the first electric field area, the second matrix electric field including a third electric field area and a fourth electric field area separated from the third electric field area, the first electric field area and the third electric field area corresponding to each other, the second electric field area and the fourth electric field area corresponding to each other;
   wherein the liquid crystal lens unit enables the first electric field area of the first matrix electric field and the third electric field area of the second matrix electric field to cooperate with each other for generating a first divisional scene on the display screen corresponding to the first electric field area and the third electric field area based on a predetermined operation mode provided by the controller, and the liquid crystal lens unit enables the second electric field area of the first matrix electric field and the fourth electric field area of the second matrix electric field to cooperate with each other for generating a second divisional scene on the display screen corresponding to the second electric field area and the fourth electric field area based on the predetermined operation mode provided by the controller.

9. The multi-function lens device according to claim 8, wherein the liquid crystal lens unit further includes another liquid crystal lens structure having a third matrix electric field, the first matrix electric field further including a fifth electric field area separated from the first electric field area and the second electric field area, the second matrix electric field further including a sixth electric field area separated from the third electric field area and the fourth electric field area, the third matrix electric field including a seventh electric field area corresponding to the fifth electric field area and the sixth electric field area;
   wherein the controller is configured to control the liquid crystal lens structures according to the predetermined operation mode for enabling the fifth electric field area of the first matrix electric field, the sixth electric field are of the second matrix electric field and the seventh electric field area of the third matrix electric field to cooperate with each other, thereby generating a third divisional scene corresponding to the fifth electric field area, the sixth electric field area and the seventh electric field area on the display scene of the multi-function lens device;
   wherein the third divisional scene is a zoom-in scene or a zoom-out scene.

\* \* \* \* \*